United States Patent [19]

Baudouin et al.

[11] 3,992,220

[45] Nov. 16, 1976

[54] NEW COMPOUND OF A CALCIUM TRISULFOALUMINATE BASE, AND PROCESS FOR ITS MANUFACTURE

[75] Inventors: Jacques Baudouin, Montelimar; Jean-Pierre Caspar, Le Teil, both of France

[73] Assignee: Lafarge, S.A., Paris Cedex, France

[22] Filed: Nov. 11, 1974

[21] Appl. No.: 522,902

[30] Foreign Application Priority Data

Nov. 9, 1973 France .............................. 73.40027

[52] U.S. Cl. ............................................... 106/306
[51] Int. Cl.² ...................... C09C 1/02; C09C 1/28; C09C 1/40

[58] Field of Search ..................................... 106/306

[56] References Cited
UNITED STATES PATENTS

| | | | |
|---|---|---|---|
| 2,935,438 | 5/1960 | Craig | 106/306 |
| 2,943,948 | 7/1960 | Allen | 106/306 |
| 2,949,379 | 8/1960 | Boland | 106/306 |

*Primary Examiner*—J. Poer
*Attorney, Agent, or Firm*—Ernest F. Marmorek

[57] ABSTRACT

A composition is essentially of an ettringite base and contains from about 45 to 93% calcium trisulfoaluminate and from about 7 to about 55% tobermorites, of which from about 0 to 25% is hydrated silica, counted in the form of $SiO_2$.

2 Claims, No Drawings

COMPOUND OF A CALCIUM TRISULFOALUMINATE BASE, AND PROCESS FOR ITS MANUFACTURE

BACKGROUND OF THE INVENTION

The invention relates to a new compound of a calcium trisulfoaluminate base and also to a process for its manufacture.

The manufacture of ettringite (calcium trisulfoaluminate) starting with aluminum sulfate is already known.

In the French Pat. No. 72/40,247, applied for by the applicants on Nov. 13, 1972, there is described a process for the manufacture of a fine, white charge for industry, as well as the ettringite essentially obtained by the process. In accordance with the cited patent, the process for the preparation of the ettringite or calcium trisulfoaluminate ($3\ CaO.\ Al_2O_3.\ 3\ CaSO_4.\ 32\ H_2O$) is characterized by the simultaneous hydration of a mixture of an accurate stoichiometric composition at a temperature from about 20° to about 90° C of calcium aluminate, calcium sulfate which is as white as possible, and water in at least a quantity for a stoichiometric proportion for the reaction and at the maximum such that after the reaction, a product containing 5% by weight of ettringite (in dry form) and 95% (by weight of water), is obtained, the stoichiometry being defined by at least one of the following reactions:

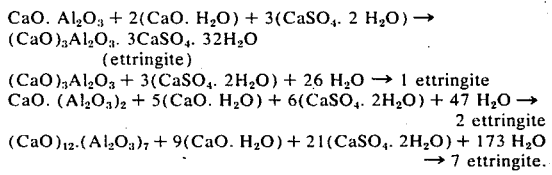

The obtained charge principally consists of ettringite (calcium trisulfoaluminate).

It is indicated in the above mentioned patent, that the process described there does not only allow the production of all forms such as dry powder, solutions, or suspensions of concentrations or contents, practically variable at will, but also allows the utilization, as the starting materials, of different industrial compounds such as, for example, aluminous cements, unburnt cements, calcium sulfates, as well as hydraulic binders which do not exactly possess the properties of the cements which, normally, they are destined to form.

It is known that the calcium silicates — providing the utilized water of a sufficient quantity — become hydrated by furnishing a mixture of hydrated calcium silicates, hydrated lime and eventually of silica. The hydrated silicates referred to as tobermorites are present in the form of hydrates of the general formula $x\ CaO.\ y\ SiO_2.\ z\ H_2O$, with $x/y$ between from about 0.4 to about 3 and $z/y$ between from about 0.5 to about 6. The Afwilite of the chemical formula of $3\ CaO.\ 2\ SiO_2.\ 2$ to $4\ H_2O$ is present as a particular type of tobermorite.

The present invention utilizes this last hydration reaction as a source of lime for the manufacturing procedure, beginning with hydrated aluminum sulfate as starting material, of a compound essentially of calcium trisulfoaluminate.

SUMMARY OF THE INVENTION

Generally speaking, the new compound comprises from about 45 to 93% by weight of hydrated calcium trisulfoaluminate and from about 7 to about 55% by weight of tobermorites of which from about 0 to 25% by weight are hydrated silica counted as $SiO_2$.

One process for the preparation of the compound according to the invention features a hydration process in accordance with the cited patent; this process is characterized by the hydration of the silicates in an aqueous phase, namely in the presence of an excess of water and at temperatures from about 10° to about 100° C. The hydration process can be applied to the mixture of raw materials or a hydrate from the product containing the silicates which can be formed first to which is added the aluminum sulfate.

Finally, all additives, all the mixtures perfected for the manufacture and the traditionally utilized Satin White, can be utilized with the product of the present invention. All other processes known for the manufacture of Satin White can be employed with the same effect.

As calcium silicates, one can utilize natural or synthetic mono-, di and tri-calcium-silicates; one can also use industrial products containing such silicates and, more particularly, the white hydraulic Portland cement, which mainly includes di-, and tri-calcium silicates. The commercial form of the white Portland cement, or either ground-up or unground clinkers of said Portland cement are also suitable. Of course, the common grey Portland cement or all types of Portland cement can be employed if there is no concern over the color of the charge obtained. Other products, which are called white limes and which are enriched in di-, and tri-calcium silicates can likewise be suitable. Finally, natural or synthetic anhydrous basic calcium silicates, such as the Wollastonite can be used, but the process is much slower.

The tests carried out by the applicants have brought to light the fact that the hydration of the calcium silicate or of the Portland cement, used for the formation of the calcium sulfoaluminate, leads to mixtures of silica and of calcium trisulfoaluminate. If one starts with pure calcium silicates, depending on the selected silicate, one obtains:

from about 55 to 7% of tobermorites, of which from about 0 to 25% by weight is hydrated silica, counted as $SiO_2$, and from about 45 to about 93% by weight of calcium trisulfoaluminate.

The preliminary hydration of the calcium silicate leads to mixtures of trisulfoaluminate and tobermorites.

The invention accordingly comprises the several steps and the relation of one or more of such steps with respect to each of the others, all as exemplified in the following detailed disclosure, and the scope of the application will be indicated in the claims.

DESCRIPTION OF THE PREFERRED EMBODIMENTS

In the following, there is described compounds mixed according to the invention, and their preparation.

EXAMPLE 1

Into a standard grinder of the ball-mill type, which is furnished with balls of corundum and with an elastomeric lining to prevent contamination of the tint, there is introduced water and the following mixture, this being done in a manner so that the initial dry extract amounts to about 20% by weight:

| | |
|---|---|
| pure tricalcium silicate | 456 parts by weight |
| hydrated aluminum sulfate with 18 molecules of water | 666 parts by weight. |

The grinder was allowed to turn around for 6 hours while allowing the reaction to liberate the calories which it produces. The temperature increased to about 70° C. The evolution of the chemical reactions can be followed by means of X-ray diffraction analyses and after 6 hours, the total aggregate of the starting materials had disappeared by forming a mixture of calcium trisulfoaluminate and of silica gel, having a composition of about 92% by weight of calcium trisulfoaluminate and of about 8% by weight of silica.

This powder was concentrated through filtration, then it was dried through atomization, and it was observed that it comprised micron-sized particles, of small rod-like elements of Satin White and of angular particles of silica gel. The powder displayed the following characteristics:

| | |
|---|---|
| appearance | impalpable white powder; |
| fineness | 100% <8 microns |
| composition | co-precipitated mixture of calcium trisulfoaluminate (Satin white) of about 92% by weight and hydrated silica of about 8% by weight. (These percentages are given for the particular conditions of this example); |
| specific gravity | 1.98 |
| pH of 10% solution | 8.5 |
| whiteness | 94.2% |
| abrasiveness (Valley-method) | 12 ± 5 mg. |

The dispersions of the mixture in water show characteristics of high degrees of thixotropy. This charge can be utilized in the paper-making industry where it distinguishes itself by the characteristics of the Satin White. It can also be utilized in paints as thickening agent, or for the thickening of liquids, or in drilling muds, or the like.

EXAMPLE 2

In a grinder equipped with corundum balls, one has completely hydrated 540 parts by weight of commercial white Portland cement of the following composition:

| | | |
|---|---|---|
| $SiO_2$ | 23.7 | parts by weight |
| $Al_2O_3$ | 2.7 | parts by weight |
| $SO_3$ | 1.2 | parts by weight |
| CaO | 69.3 | parts by weight |
| $Fe_2O_3$ | 0.3 | parts by weight |
| volatile components | 1.8 | parts by weight | by allowing the grinder to turn around under customary conditions and in the presence of an excess of water, during about 14 hours at about 60° C.

Through X-ray diffraction analysis, it has been determined that the cement becomes hydrated while furnishing tobermorites and calcium hydroxide. The thermo-gravimetric analysis has revealed that 540 parts of cement have led to 307 parts by weight of lime and 418 parts by weight of tobermorites.

Subsequently, 460 parts by weight of aluminum sulfate with 18 molecules of water were progressively introduced into the grinder. One again set the grinder in motion and after 30 minutes, it is observed that the reaction has terminated. In this manner, there is obtained a suspension of intimately mixed white, co-crystallized, crystals of the following composition, namely about 67% by weight of calcium trisulfoaluminate and about 33% by weight of tobermorites.

The suspended powder, dried by known means such as atomization, had the following characteristics:

| | |
|---|---|
| appearance | impalpable white powder; |
| whiteness | 96.7% |
| specific gravity | 2.04 |
| fineness | 100% <9 microns. |

Thus, the utilization of the tri-calcium silicate has led to mixtures respectively constituted of from about 45 to about 93% by weight of the first constituent and of from about 55 to about 7% by weight of the second one.

The quantities of the utilized products allow one, according to simple laboratory tests, to furnish mixtures partially including tobermorites and silica as components and formed from the calcium silicates.

The product of the invention possesses the characteristics of fineness, of whiteness, of smoothness equal or superior to those of Satin White. Its specific gravity remains of a very low order of magnitude. However, compared to Satin White, it is capable of forming pastes of much higher concentration in an aqueous medium and therefore, has a great advantage over this pigment. In this manner, formulations for the coating of paper can be made in an easy manner and at a cheap price, e.g., by using this pigment in combination with kaolin.

The pieces of information which follow, will give details of the qualities of the compounds according to the invention and utilized in paints.

EXAMPLE 3

In order to demonstrate the high quantities in dry extract which one can obtain with the product according to the invention, a comparison between an aqueous dispersion of the product listed in example 2, and of commercial Satin White at about 40% by weight of dry extract can be made. There is added to each of the indicated quantities of the fluidifying polyacrylate as shown in Table 1, the viscosities of the dispersions which were measured by means of a BROOKFIELD viscometer (at 100 rpm and at about 20° C):

TABLE 1

| Dispersion | Dispersion Agent in % by weight | Viscosity in cp |
|---|---|---|
| Satin White | 0.6 | 590 |
| Charge in accordance with invention (Example 2) | 0.5 | 45 |

In another test, there was determined the maximum content in dry extract by weight furnishing pastes having a viscosity of about 5 poises measured by means of a BROOKFIELD viscometer. The following was obtained:

TABLE 2

|  | concentration at 5 poises: |
| --- | --- |
| Satin White: charge accordng to) | 27% by weight |
| invention): (example 2) ) | 54% by weight |

EXAMPLE 4

So as to bring to light the qualities of the charge in accordance with the invention, comparison was made for the measured physical and optical characteristics with those of powders of the same degree of fineness:

TABLE 3

|  | kaolin for coating purposes : | Satin White : | charge in accordance with the invention (example 2) |
| --- | --- | --- | --- |
| whiteness : | 91 : | 92.6 | 94.1 |
| specific gravities: | 2.60 : | 1.92 | 2.05 |

This example illustrates the advantage in the charge in accordance with the invention. The instant charge possesses a whiteness which is superior to that of the kaolin and even to that of Satin White. Moreover, it maintains a specific gravity very close to that of Satin White and of a distinctly lower order of magnitude than that of kaolin, which is a definite advantage for light coatings such as for paper.

EXAMPLE 5

An AFNOR VII paper has been coated with a thick preparation solely pigmented with kaolin (I), with a pigmentation consisting of about 80% by weight of kaolin and about 20% by weight of Satin White (II) and, finally, with a pigmentation consisting of about 80% by weight of kaolin and about 20% of the charge in accordance with the invention (III). The following optical characteristics, measured by the traditional methods on a coated paper having one surface coated at 10 g/m² were obtained:

TABLE 4

|  | I | II | III |
| --- | --- | --- | --- |
| whiteness(Elrepho method)- in % | 82.2 | 85.2 | 85.3 |
| glossiness(photovolts)- in % | 33 | 42 | 40 |
| structure of coating | closed | micro-porous | micro-porous |
| opacity | 88.1 | 89.1 | 89.1 |
| proportion of the starch/latex binder employed for 100 parts by weight of pigment | 8/8 | 8.8/8.8 | 8.8/8.8 |
| tear-off velocity [or rate] in cm/sec. ink 3804 | 75 cm/sec. | 85 cm/sec. | 90 cm/sec. |

Thus, in accordance with the invention, one can produce coating formulas which contribute to the known advantages of Satin White, while considerably reducing its inconveniences and allowing one to realize appreciable savings owing to a better yield of the chemical reaction.

It should be added moreover, that this charge can be utilized as a thickening agent for paints, or as a charge for thermosetting products or the like.

We wish it to be understood that we do not desire to be limited to the exact details described, for obvious modifications will occur to a person skilled in the art.

Having described the invention, what we claim as new and desire to be secured by Letters Patent, is as follows:

1. In the process forming a composition essentially consisting of about 67 per cent by weight of calcium trisulfoaluminate, about 33 per cent by weight of tobermorites, and possibly silica, the steps comprising:
   hydrating white Portland cement with water in excess of that needed for hydration, with agitation, and subsequently
   combining hydrated aluminum sulfate and said hydrated white Portland cement, and
   allowing said aluminum sulfate and hydrated cement to form said composition.

2. A process as claimed in claim 1, wherein said hydrating is carried out at a temperature of from about 10° to 100° C.

* * * * *